(12) United States Patent
Skrædderdal

(10) Patent No.: US 10,520,350 B2
(45) Date of Patent: Dec. 31, 2019

(54) CONTROLLED BATCH DISTRIBUTION

(71) Applicant: MAREL A/S, Aarhus N (DK)

(72) Inventor: Henning Skrædderdal, Viby J (DK)

(73) Assignee: MAREL A/S, Aarhus N (DK)

( * ) Notice: Subject to any disclaimer, the term of this patent is extended or adjusted under 35 U.S.C. 154(b) by 156 days.

(21) Appl. No.: 15/547,321

(22) PCT Filed: Jan. 28, 2016

(86) PCT No.: PCT/DK2016/050026
§ 371 (c)(1),
(2) Date: Jul. 28, 2017

(87) PCT Pub. No.: WO2016/119796
PCT Pub. Date: Aug. 4, 2016

(65) Prior Publication Data
US 2017/0356790 A1    Dec. 14, 2017

(30) Foreign Application Priority Data

Jan. 28, 2015    (DK) .................................. 2015 70049

(51) Int. Cl.
*G01G 13/24*    (2006.01)
*G01G 19/387*    (2006.01)
(52) U.S. Cl.
CPC ........... *G01G 13/24* (2013.01); *G01G 19/387* (2013.01)
(58) Field of Classification Search
CPC ..... G01G 13/24; G01G 19/387; G01G 19/393
See application file for complete search history.

(56) References Cited

U.S. PATENT DOCUMENTS

| | | | | |
|---|---|---|---|---|
| 3,939,928 A | * | 2/1976 | Murakami | G01G 13/00 177/25.18 |
| 4,508,186 A | * | 4/1985 | Sashiki | G01G 13/02 177/1 |
| 4,522,274 A | | 6/1985 | Konishi et al. | |
| 4,678,046 A | | 7/1987 | Mosher | |
| 4,793,420 A | * | 12/1988 | Hirano | G01G 13/248 177/50 |
| 5,760,342 A | * | 6/1998 | Takeda | G01G 19/393 177/25.18 |
| 5,859,389 A | * | 1/1999 | Tatsuoka | G01G 19/393 177/17 |

(Continued)

FOREIGN PATENT DOCUMENTS

WO    2016119796 A1    8/2016

OTHER PUBLICATIONS

International Search Report from PCT Application No. PCT/DK2016/050026, dated Apr. 20, 2016.

*Primary Examiner* — Randy W Gibson
(74) *Attorney, Agent, or Firm* — Workman Nydegger

(57) ABSTRACT

A method of generating batches of food items, includes transferring food items to a weight determination means where the weight of the food items are obtained for single food items and/or food items in groups, and generating a plurality of batches based on the obtained weight of the single food items and/or food items in groups. The step of generating batches is controlled such that the weight of batches is within a pre-defined weight range, and such that the distribution of the batches within the weight range is pre-defined.

20 Claims, 2 Drawing Sheets

(56) References Cited

U.S. PATENT DOCUMENTS

| | | | | |
|---|---|---|---|---|
| 5,998,740 | A | * | 12/1999 | Kvisgaard ................. B07C 5/18 177/119 |
| 6,321,135 | B1 | * | 11/2001 | Asgeirsson ............... B07C 5/38 198/358 |
| 7,258,237 | B2 | * | 8/2007 | Nielsen ..................... B07C 5/16 177/145 |
| 7,395,934 | B2 | * | 7/2008 | Gudjonsson .............. B07C 5/18 177/25.18 |
| 2004/0262202 | A1 | * | 12/2004 | Jensen ...................... B07C 5/16 209/592 |
| 2008/0283307 | A1 | | 11/2008 | Kawanishi |

* cited by examiner

CONTROLLED BATCH DISTRIBUTION

FIELD OF THE INVENTION

The present invention relates to a method of generating batches of food items in a controlled way.

BACKGROUND

In the past, in most cases "batching" has been considered as "fixed weigh batching", meaning that when working with a target weight for a batch, e.g. 400 g, the total weight of a consignment of packages (batches) are expected to weigh the pack weight (the batch weight) multiplied by the number of packages. Everything above that is considered as "give away" that the manufacturer must bear and thus it is obviously a general desire to keep that as low as possible.

However, such a fixed weight approach is often not very customer friendly approach because the customer target group may differ significantly.

SUMMARY OF THE INVENTION

The present invention overcomes the above mentioned problem by a method that make batches with pre-defined distribution.

According to a first aspect of the invention, a method is provided generating batches of food items, comprising:
transferring food items to a weight determination means where the weight of the food items are obtained for single food items and/or food items in groups,
generating a plurality of batches based on the obtained weight of the single food items and/or food items in groups, wherein the step of generating batches is controlled such that the weight of batches is within a pre-defined weight range, and such that the distribution of the batches within the weight range is pre-defined.

Accordingly, it is now possible to adjust the distribution of the batches to customers need, e.g. adjust the batch weight distribution to the target market. As an example, customer target group within a particular area may on average be a family of 2-4 people meaning that the customer of 2 people is obviously looking for a batch of different target weight than the customer of 4 people. Thus, by adjusting the distribution of the batches in this way the weight distribution of the batches can match the weight distribution demand that is needed within this particular area. As an example, a large supermarket located within a campus may have a completely different customer target group than a supermarket located in a suburb where not Universities are located.

The term batch is to be understood as accumulating two or more food items at a given area, e.g. in a tray or a bag such that a pre-defined weight target is reached. This may be done with different devices such as conveyors where food items are conveyed and removed from the conveyor into a bag/bin/hopper via a sweep arms. Another equipment that may be utilized is a so-called multihead combination weighing device (MCWD) which is well known to a skilled person, where items are randomly distribute into plurality of weighing hoppers arranged around a distribution unit, and where the most optimal combination of items in two or more weighing hoppers is selected such that a target weight for that batch is reached. An example of such batches are poultry parts in a tray or a bag and the like, where the bag may be e.g. 700 g (target weight), where this target weight may e.g. be reached via a combination of poultry parts (or any other type of food items) in two or more weighing hoppers where the poultry parts are removed simultaneously from the weighing hoppers into e.g. a bag position there below.

In one embodiment, the pre-defined weight range is defined by a first weight value and a second weight value, where the second weight value is larger than the first weight value, and where the pre-defined weight range is adjustable by means of adjusting at least one of the first weight value and the second weight value. The term first weight value may also be understood as first target weight value and the term second weight value may be understood as a second target weight value, where e.g. 500 g may be a first weight value and 1000 g may be a second weight value, and where 500 g-1000 g is thus the defined weight range. Also, the first/second weights or target weights may be associated with some "tolerance deviation" or margin of error, e.g. ±5% (or any other acceptable % value) meaning that if e.g. the first weight value above is e.g. 500 g±5% and the second weight value is 1000 g±5%.

It is thus possible to easily change and adapt the weight range for e.g. a new order from a new customer, where the new customer may e.g. have a completely different customer target group.

In one embodiment, the pre-defined weight range is divided into two or more sub-weight ranges. Referring to the example above where the pre-defined weight range is 500 g-1000 g, this weight range interval may e.g. be divided into e.g. five sub-weight ranges, e.g. 500-600 g is a first sub-weight range, 600-700 g is a second sub-weight range, 700-800 g is a third sub-weight range, 800-900 g is a fourth range and 900-1000 g is the fifth and last sub-weight range. The number of sub-weight ranges may of course be less than five or more than five.

In one embodiment, the distribution of batches within a given sub-weight range selected from the two or more sub-weight ranges is pre-defined or substantially flat. Another example for a narrower pre-defined range is where the distribution of the food items is between e.g. 400 g to 450 g, meaning that the produced batches are all between 400 g and 450 g. In case of sub-weight ranges, this predefined range may, as already addressed, be divided into a plurality of sub-weight ranges where e.g. within each sub-range there is approximately the same number of food items, i.e. substantially even distribution. As an example, there could be 100 batches in the sub-range 400 g to 410 g, 100 batches in the sub-range 411 g to 420 g, 100 batches in the sub-range 421 g to 430 g, 100 batches in the sub-range 431 g to 440 g and 100 batches in the sub-range 441 g to 450 g.

In one embodiment, each of the two or more sub-weight ranges have an associated prioritization variable indicating prioritization of batches within the two or more sub-weight ranges and where the prioritization variable is utilized as an operation parameter in indicating the prioritization of the which of the two or more sub-weight ranges a batch is to be selected. In an embodiment, this variable may be determined based on the percentage of batches within each of the two or more sub-weight ranges such that the higher the percentage is the higher is the prioritization variable. Referring to the example above where the weight range is between 500 and 1000 g, the highest percentage rate may be 700-800 g, e.g. 50% of all the batches shall be within the sub-weight range, 15% shall be within 600-700 g sub-weight range and 15% within the 800-900 g sub-weight range, 10% within the last 500-600 g sub-weight range and 10% within the 900-1000 g sub-weight range.

In one embodiment, the batch weight generated within a given sub-weight range selected from the two or more sub-weight ranges is randomly selected. As an example, a MCWD may be used where items are randomly distribute into plurality of weighing hoppers arranged around a distribution unit. The batch weight selection in such a random manner may be performed such that e.g. the MCWD, or any other device, finds a batch weight within a given range, e.g. 600-700 g, where the random selection simply means that it is sufficient that the selected batch weight lies somewhere within this interval of 600-700 g. Thus, the first combination of food items performed by e.g. the MCWD, i.e. combination of items in typically two or more weighing hoppers that results in a target weight that lies within a selected sub-weight range may be selected in thus the processing power and time needed may be saved.

In one embodiment, the pre-defined sub-weight ranges are defined by a first sub-weight value and a second sub-weight value, where the second sub-weight value is larger than the first sub-weight value, and where the pre-defined sub-weight ranges are adjustable by means of adjusting at least one of the first sub-weight value and the second sub-weight value, and/or the pre-defined sub-weight ranges are defined by the percentage number of batches to be generated within the sub-weight ranges. Referring to the example above where the pre-defined weight range is 500-1000 g, taken the sub-weight range of 600-700 g as an example, the first sub-weight value is 600 g and the second sub-weight value is 700 g. Moreover, the width of the range or ranges may be adjusted by adjusting one or both of these sub-weight values. The remaining sub-range values may in one embodiment be automatically adjusted based thereon, or they may be adjusted independently. This may e.g. be of advantage when the making a specific sub-weight range broader/narrower because the customer target group may be different or because a specific sub-weight range should simply not exist for a given order of batches.

In one embodiment, a random target weight value is selected or defined for each two or more sub-weight ranges where the selection of a batch weight within each of the two or more sub-weight ranges comprises selecting a batch weight having batch weight being substantially the same as the target weight value of the selected sub-weight range.

Referring to the example above, a random target weight selection for this interval could e.g. be 650 g (or any single value within this sub-weight range) and this target weight value is preferably updated after each batch generation. Accordingly, referring to the example above, a first target weight value (for the first sub-weight range) could be 650 g at one instant within the first weight range, a second target weight value (for the second sub-weight range) could be 770 g at one instant, a third target weight value could be 830 g etc. at one instant.

Referring to the example above and e.g. assuming a MCWD is used to generate the batches, one of the criteria may be to try to make the batch weight as close as possible to the target batch weight and/or at least within the limits within the actual sub-weight range, i.e. the search related to the 650 g covers the sub-weight range from 600 g to 700 g and if this is not possible a combination will be searched as close as possible to 770 g if this range has second highest prioritization.

In one embodiment, the step of utilizing the prioritization variable as operation parameter comprises:
determining whether a combination of food items exists within a sub-weight range having a highest prioritization variable,
where in case such a batch weight exists,
combining the food items together into a batch,
otherwise,
determining whether a sub-weight range having lower prioritization exists having a lower prioritization variable followed in accordance to an hierarchical order of the prioritization variables.

Referring to the example above, this might be the case if a batch weight within the range 700-800 g does not exist, i.e. the range having the highest priority, then the 600-700 g or 800-900 g would be checked, i.e.t those having the second highest priority.

In one embodiment, the prioritization variable is dynamically adjusted based on the current amount of batches within the sub-weight range and a pre-defined percentage number indicating a number of batches to be generated within the sub-weight range.

In one embodiment, the prioritization variable is dynamically adjusted based on the current amount of batches and the pre-defined distribution of batches in each of the two or more sub-weight ranges.

In that way, the batch generation just moves forwards if a batch weight highest priority does not exist, then it check the second highest priority etc. in accordance to the hierarchical order, where the hierarchical order may be constantly updated because the prioritization variable for different sub-weight ranges changes constantly. A given sub-weight range have highest number of percentage in batches (e.g. 50% of all batches are to be within this range) and thus initially has the highest prioritization, i.e. when all the sub-weight ranges are "empty". During the batch generation, if this sub-weight range is e.g. close to be completed whereas another sub-weight range having lower percentage (e.g. 10% of all batches are to be within this range) but which is e.g. almost "empty" (i.e. very few batches have been generated within this sub-weight range), then this sub-weight range will have a higher prioritization. Thus, this percentage number and the "shortage" within the sub-weight ranges may be considered as being the key variables, if not the only variables, in constantly or repetitively updating the prioritization variable for the sub-weight ranges.

Another example of the implementation of the method according to the present invention may be able to work with several ranges in parallel—an example:
20% of the batches in the range 600 g to 650 g
20% in the range 651 g to 700 g
30% in the range 701 g to 800 g
20% in the range 801 g to 850 g
10% in the range 851 g to 900 g
all ranges that may have approximately the same number of food items, i.e. with a substantial flat distribution, and where all batches may be price marked individually (not fixed price).

In one embodiment, the batches are of various pre-defined weights, and where the batches are marked individually according to weight and/or price.

In a second aspect of the invention a batching apparatus is provided for generating batches of food items, comprising means for transferring food items to a weight determination means where the weight of the food items are obtained for single food items and/or food items in groups,
means for generating a plurality of batches based on the obtained weight of the single food items and/or food items in groups,
a control unit for controlling means for generating the plurality of batches such that the weight of batches is within a pre-defined weight range, and such that the distribution of the batches within the weight range is pre-defined.

In one embodiment, the batching apparatus comprises a multihead combination weighing device (MCWD), where the food items are weighed either individually, or in groups, in a number of weight determining devices and where the content of some of the weight determined individual items or groups subsequently are combined together to make up the batches.

In one embodiment, the apparatus comprises weighing means for either individually weighing the food items or weighing them in groups, on at least one dynamic weight determining device and where the individual items or the groups subsequently are conveyed by a conveyor means along a number of guide members where the individual items or the groups are guided together to make up the batches, the individual food items or the food items groups that are guided together are not necessarily conveyed next to each other.

In one embodiment, the batches of various pre-defined weights are made in sub-weight ranges, which sub-weight ranges are of pre-defined size relative to each other in relation to number of individually items or groups In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 a flowchart of a method according to the present of generating batches of food items.

DESCRIPTION OF EMBODIMENTS

Figure 1:
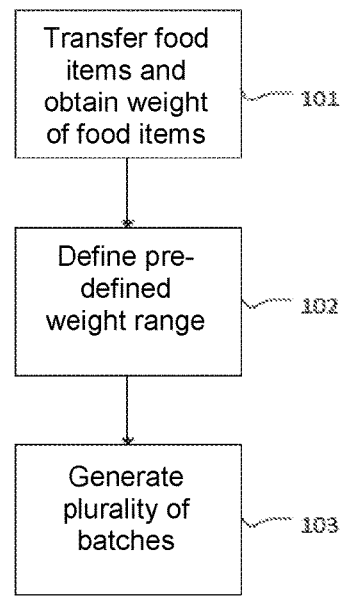

FIG. 1 shows a flowchart of a method according to the present of generating batches of food items.

In a step 101, food items are transferred to a weight determination means where the weight of the food items are obtained for single food items and/or food items in groups, where the group of food items can be where two or more food items lie next or e.g. on top of each other or somehow in overlapping manner.

In a step 102, a pre-defined weight range is defined, where the pre-defined weight range is defined by a first weight value and a second weight value, where the second weight value is larger than the first weight value. As an example, a first weight value could be 500 g and the second weight value could be 1000 g, where 500-1000 g is thus the pre-defined weight range.

In a step 103, a plurality of batches is generated based on the obtained weight of the single food items and/or food items in groups, wherein the step of generating batches is controlled such that the weight of batches is within at least one pre-defined target weight range, and such that the distribution of the batches within the weight range is pre-defined.

Figure 2:
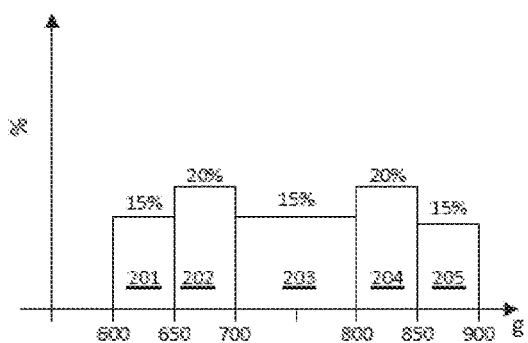
FIGS. 2 and 3 depict graphically examples of a utilization of the method in FIG. 1.
Figure 3:
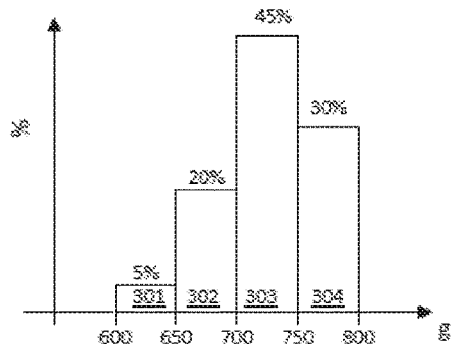

The diagrams shown in FIGS. 2 and 3 depict graphically examples of a utilization of the method in FIG. 1 where the vertical axis is the percentage of batches to be produced and the horizontal axis shows different weight ranges in grams, where in FIG. 2 the pre-defined weight range is from 600 g to 900 g, and in FIG. 3 the pre-defined weight range is from 600 to 800 g.

In the example depicted in FIG. 2, the defined weight range is divided into five sub-weight ranges, namely sub-weight range from 600-649 g 201, sub-weight range from 650-699 g 202, sub-weight range from 700-799 g 203, sub-weight range from 800-849 g 204, and sub-weight range from 850 g-900 g 205. Moreover, a pre-defined distribution of the batches to be generated is shown where each of the sub-weight ranges has an associated a percentage number indicating the percentage of the batches within the sub-weight ranges to be made, namely 15% for sub-weight range 201, 20% for sub-weight range 202 etc.

As FIG. 2 also shows is that the width of the sub-weight ranges 201-205 does not have to be the same, i.e. the width of sub-weight range 203 extends from 700-799 g and is thus obviously broader than the width of the remaining sub-weight ranges that cover 50 g weight range.

FIG. 3 shows another example of another distribution of batches where the pre-defined weight range is from 600 g to 800 g, and where this pre-defined weight range is divided into four sub-weight ranges 301-304, all of which have a width of 50 g. In this example, 45% of the batches is to lie within the sub-weight range between 700-750 g whereas e.g. only 5% of the produced batches is to lie within the sub-weight range 301 from 600-650 g.

The equipment generating such batches may as an example be, but is not limited to, a conventional grader comprising a conveyor belt and a plurality of sweep arms operated by a control unit to move into an open position to sweep a food item into a receiver location where the batch is being generated.

Another example of such an equipment is commonly referred to as a multihead combination weighing device (MCWD), where plurality of items are collected in plurality of bins and/or weighing hoppers, and when an optimal combination is reached the items in the bin/weighing hopper is dropped into e.g. a bag, tray and the like.

In one embodiment, the sub-weight ranges shown in FIGS. 2 and 3 may have an associated a prioritization variable for ranking the sub-weight ranges, meaning that e.g. a sub-weight range that is most behind may be prioritized when it is desired to which interval a drop should be directed.

If as an example two intervals are even, then the sub-weight range with the highest percentage value may be prioritized highest (e.g. an interval that is planned to collect 30% is prioritized higher that an interval that is planned to collect 15%).

Moreover, this prioritization variable may be automatically updated such that although a given sub-weight range has the highest percentage, another sub-weight range with lower percentage may be prioritized because of shortage of batches within this sub-weight range with lower percentage.

In one embodiment, when an sub-weight range is selected, a random target value may be chosen between minimum and maximum sub-weight values defining the sub-weight range in question, where the method may be configured to try to find a combination as close to this target weight as possible.

If is it not possible for e.g. the MCWD to find a combination with a weight between minimum and maximum of the interval in question, then the MCWD will preferably continue by searching for a combination for the second-highest priority etc. In that way, a kind of a hierarchy structure may be used.

In one embodiment, if a bin and/or weighing hopper in the MCWD is overfilled, it may be checked if its content alone can fit into one of the defined intervals. If so, it is used there although it was not "first in line".

EXAMPLE 1

Controlled Batch Distribution with Combination/Multihead Weigher

Figure 4:
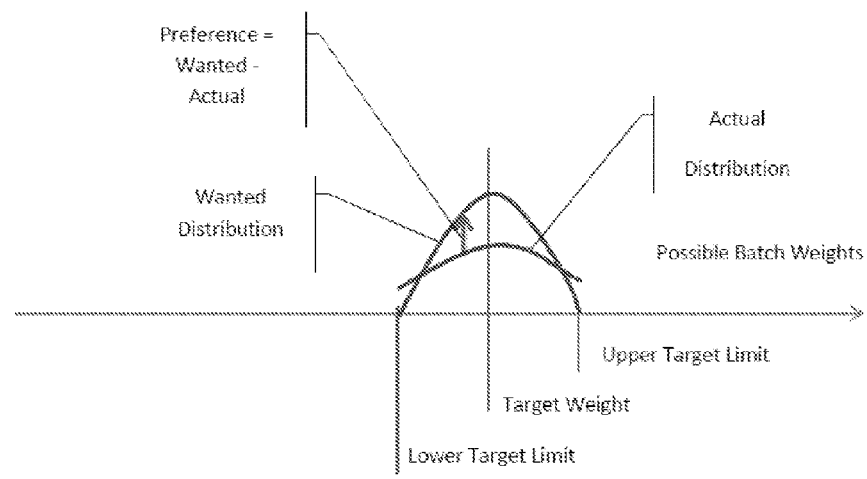
FIG. 4 depicts a batch distribution with multihead combination weighing device (MCWD)

To form a specific batch, a commonly used MCWD batching algorithm selects one combination from a set of possible combinations, where the selection criteria can be that the combination must lie between a lower and an upper target limit, and must be as close as possible to the target weight as shown graphically in FIG. 4.

An additional criterion can be that a running average of batch weights must be equal to or higher than the target weight.

Possible combinations can either be compared during the search for combinations, so that the best possible solution is found at the end of the search or, or the found possible combinations can be organized in a way, which makes the selection easy, e.g. the results can be sorted into a list of possible item weights in rising order.

The typical result of a traditional MCWD is that batch weights concentrate around the target weight.

By means of moving the target weight it is possible to obtain a different batch distribution, and if e.g. the target weight is moved forth and back between the Lower and the Upper target limits (and maintaining the original lower and upper target limits) with equal small steps for each new batch, it will typically result in a more flat distribution of batch weights.

The target weight can also be moved according to a target distribution, e.g. a normal distribution and in this way affect the batch distribution towards a similar shape.

Another way to affect the batch distribution is to compare the actual batch distribution up against a wanted batch distribution and, to a given batch-weight, let the difference between the wanted and the actual distribution represent a preference value for the given batch-weight.

To make it easy to define a wanted distribution, the wanted distribution can be defined by means of weight bands, each with an associated percentage of batches or of raw material.

|  |  |  |  | Possible Batch Weights |
|---|---|---|---|---|
| Weight Band 1 N1% |  | Weight Band 2 N2% | Weight Band 3 N3% | Weight Band 4 N4% |

The distribution control can either be done in one or in two steps. The one-step method can be any of the previous mentioned methods, while in a two-step method, a preferred combination is calculated for each individual weight band and the selection is done between the found possibilities, either by means of the target distribution or the difference between the wanted and the actual percentage in the given weight bands.

EXAMPLE 2

Controlled Batch Distribution with the Reverse Method

The phrase "Reverse method" is sometimes used to describe a method where a number of batches are built up in parallel and where for each weighed item a decision process is performed to decide into which unfinished batch (i.e. batch under built-up) this particular item is to be transferred to. The phrase "reverse" refers to the decision process where the missing quantity of a batch is a dominating parameter when deciding where the item should go to. The method is mostly used when bringing items together in batches with a so-called grader. Such one contains typically a weighing station with a conveyor belt where a weight of each item is determined one by one while they pass over the weighing station on the conveyor. Next to the weighing station a conveyor is placed to take the weighed items further. Alongside this conveyor a number of swing-arms are placed where each one can take a selected item off the conveyor and bring it into a bin sitting at the side of the conveyor. The batches are collected in these bins and mechanisms are provided to empty them.

To form a specific batch, with such equipment, the backwards calculations from a target point or a target range is done, and then used as an accept criteria or control mechanism for the batch build up.

Figure 5:
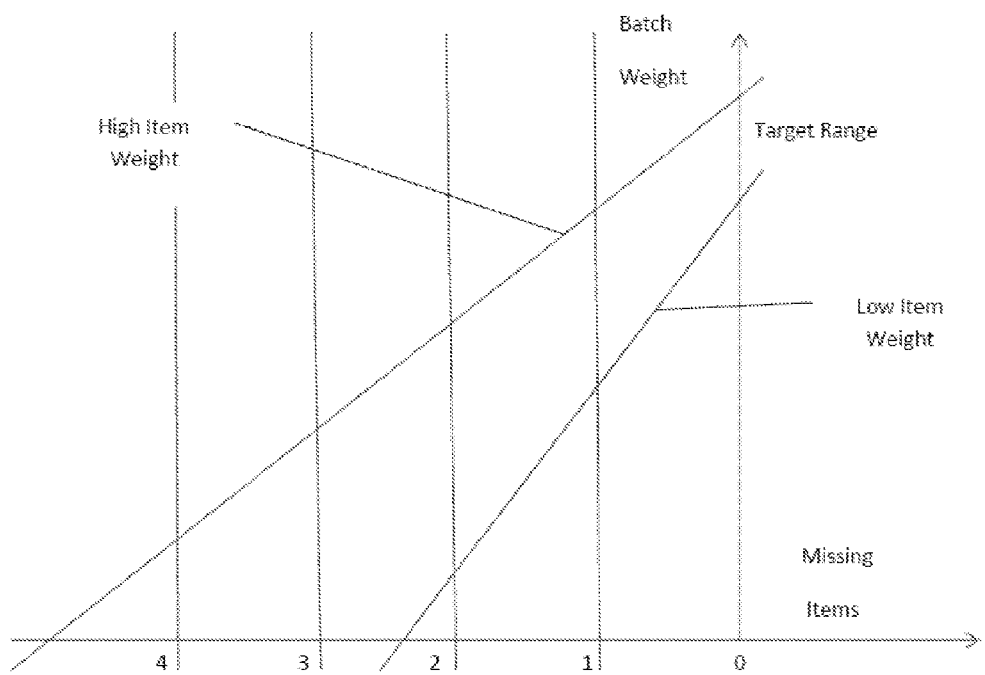
FIG. 5 illustrates how a target weight range can be reached for batches.

FIG. 5 illustrates how a target weight range can be reached. By keeping unfinished batches inside a funnel defined by a high and low limit for expected item weights, the average items weights needed to finish the batch will always be between this high and low item weight.

Apart from the above the reverse method have similar types of solutions, as the methods described for combination batching, related to targeting a target weight or a target weight range.

Implementation of moving target can be done either by means of defining a new target weight range for each initiated batch, or the target weight range can be moved during build-up of the batch.

A method where the target is defined by means of weight bands with associated percentages can be implemented using a wanted distribution modified with a feed-back value based on the difference between the wanted and the actual distribution.

The invention claimed is:
1. A method of generating batches of food items with a batching apparatus, the method comprising:
transferring food items to a weight determiner,
obtaining the weight of the food items for single food items or food items in groups,
generating a plurality of batches using a batch generator based on the obtained weight of the single food items or food items in groups,
wherein the step of generating the batches is controlled such that the weight of the batches generated is within a pre-defined weight range, and
wherein the step of generating the batches is controlled such that the weight distribution of the batches generated within the weight range satisfies a pre-defined weight distribution.

2. The method according to claim 1, wherein the pre-defined weight range is defined by a first weight value and a second weight value, where the second weight value is larger than the first weight value, and where the pre-defined weight range is adjustable by an adjuster adjusting at least one of the first weight value and the second weight value.

3. The method according to claim 1, wherein the pre-defined weight range is divided into two or more sub-weight ranges.

4. The method according to claim 3, wherein the distribution of batches within a given sub-weight range selected from the two or more sub-weight ranges is pre-defined or substantially flat.

5. The method according to claim 3, wherein the batch weight generated within a given sub-weight range selected from the two or more sub-weight ranges is randomly selected.

6. The method according to claim 3, wherein the pre-defined sub-weight ranges are defined by a first sub-weight value and a second sub-weight value,
where the second sub-weight value is larger than the first sub-weight value.

7. The method according to claim 3, wherein a random target weight value is selected for each two or more sub-weight ranges and where the selection of a batch weight within each of the two or more sub-weight ranges comprises selecting a batch weight having batch weight being substantially the same as the target weight value of the selected sub-weight range.

8. The method according to claim 3, wherein each of the two or more sub-weight ranges have an associated prioritization variable indicating shortage of batches within the two or more sub-weight ranges and where the prioritization variable is utilized as an operation parameter in indicating the prioritization of the which of the two or more sub-weight ranges a batch is to be selected.

9. The method according to claim 8, wherein the step of utilizing the prioritization variable as operation parameter comprises:
determining whether a combination of food items exists within a sub-weight range having a highest prioritization variable,
where in case such a batch weight exists,
combining the food items together into a batch, otherwise,
determining whether a sub-weight range having lower prioritization exists having a lower prioritization variable followed in accordance to an hierarchical order of the prioritization variables.

10. The method according to claim 8, wherein the prioritization variable is determined based on the percentage of batches within each of the two or more sub-weight ranges such that the higher the percentage is the higher is the prioritization variable.

11. The method according to claim 10, wherein the prioritization variable is dynamically adjusted based on the current amount of batches within the sub-weight range and a pre-defined percentage number indicating a number of batches to be generated within the sub-weight range.

12. The method according to claim 1, wherein the batches are of various pre-defined weights, and where the batches are marked individually according to weight.

13. A batching apparatus for generating batches of food items, comprising:
a transferrer that transfers food items to a weight determiner where the weight of the food items are obtained for single food items or food items in groups,
a batch generator that generates a plurality of batches based on the obtained weight of the single food items or food items in groups,
a control unit that controls the batch generator such that the weight of the batches generated is within a pre-defined weight range, and such that the distribution of the batches generated within the weight range satisfies a pre-defined weight distribution.

14. The batching apparatus according to claim 13, wherein the batching apparatus comprises a multihead combination weighing device (MCWD), where the food items are weighed either individually, or in groups, in a number of weight determining devices and where the content of some of the weight determined individual items or groups subsequently are combined together to make up the batches.

15. The batching apparatus according to claim 13, wherein the apparatus comprises a weigher that either individually weighs the food items or weighs the food items in groups, on at least one dynamic weight determining device and where the individual items or the groups subsequently are conveyed by a conveyor along a number of guide members where the individual items or the groups are guided together to make up the batches, the individual food items or the food items groups that are guided together are not necessarily conveyed next to each other.

16. The method according to claim 1, wherein obtaining the weight of the food items includes obtaining individually the weight for each single food item of the food items.

17. The method according to claim 1, wherein obtaining the weight of the food items includes obtaining the weight for the food items in groups.

18. The method according to claim 1, wherein obtaining the weight of the food items includes obtaining individually the weight for each single food item of the food items and obtaining the weight for the food items in groups.

19. The method according to claim 6,
wherein the pre-defined sub-weight ranges are adjustable by an adjuster that adjusts at least one of the first sub-weight value and the second sub-weight value, or
wherein the pre-defined sub-weight ranges are defined by the percentage number of batches to be generated within the sub-weight ranges.

20. The method according to claim 1, wherein the batches are of various pre-defined weights, and where the batches are marked individually according to price.

* * * * *